United States Patent [19]

Fulton et al.

[11] Patent Number: 4,562,251

[45] Date of Patent: Dec. 31, 1985

[54] AGAROSE DERIVATIVES OF AMINO PHENYL BORONIC ACID

[75] Inventors: Scott Fulton, Brookline; Basil Yankopoulos, Peabody; Lewis Zediana, Jr., Billerica, all of Mass.

[73] Assignee: Amicon Corporation, Lexington, Mass.

[21] Appl. No.: 402,023

[22] Filed: Jul. 26, 1982

Related U.S. Application Data

[63] Continuation-in-part of Ser. No. 247,989, Mar. 26, 1981.

[51] Int. Cl.⁴ ..................... C07H 17/02; C07H 23/00
[52] U.S. Cl. ................................. 536/17.4; 536/17.1; 536/17.3; 536/115; 536/121; 544/208
[58] Field of Search ................... 536/17.3, 17.1, 17.4, 536/115, 121

[56] References Cited

U.S. PATENT DOCUMENTS 3,619,371  11/1971  Crook et al. .
4,269,605   5/1981  Dean et al. .
4,297,492  10/1981  Rasberger et al. .................. 544/208

OTHER PUBLICATIONS

Finlay et al., Anal. Biochem., vol. 87, 77-90 (1978).

*Primary Examiner*—Johnnie R. Brown
*Assistant Examiner*—Elli Peselev

[57]  ABSTRACT

Compound comprising agarose covalently bonded to amino phenyl boronic acid through a substituted triazine and an intermediate compound comprising substituted triazine bonded to amino phenyl boronic acid.

10 Claims, No Drawings

AGAROSE DERIVATIVES OF AMINO PHENYL BORONIC ACID

This application is a continuation-in-part of our application Ser. No. 247,989 filed Mar. 26, 1981.

This invention relates to supports used in glycoprotein separation and, more particularly, to the activation of such supports to greatly enhance the bonding thereto of a reactive agent containing a dihydroxyboryl group.

In a U.S. patent owned by the assignee of the present application, Dean et al., "Method and Kit for Separation of Glycoproteins", U.S. Pat. No. 4,269,605, there is described a method for separating glycoproteins from non-glycosylated proteins in a mixture by contacting the mixture with a polymeric matrix support-bound reactive agent comprising a dihydroxyboryl group, which group forms a complex with the glycoprotein. The specification states that "polymeric matrix activation prior to subsequent dihydroxyboryl ligand coupling" may be accomplished using a variety of substances, and lists materials for use with matrixes, such as polysaccharides, containing hydroxyl groups; triazines are among the materials listed.

Finlay et al. (1978) Anal. Biochem. 87, 77, describes the use of the triazine trichloro-s-triazine (TsT) (also designated cyanuric chloride) to activate support materials such as agarose gels in preparation for bonding to enzymatic ligands such as trypsin, chymotrypsin, LDH, and lactoperoxidase, and to the low molecular weight ligand 6-aminocaproic acid.

Crook et al. U.S. Pat. No. 3,619,371 similarly describes the use of s-triazinyl compounds bound to support materials such as dextran for use in binding biologically active substances such as enzymes.

Conventional procedures for covalent bonding of phenyl boronic acid to agarose result in products containing only 5–10 $\mu$ mol of phenyl boronic acid per ml of agarose support gel. Because of the low binding constant of the dihydroxyboryl group to certain target molecules such as carbohydrates, this low phenyl boronic acid content limits the utility of such sustituted gel products.

It has been discovered that the covalent bonding to agarose of amino phenyl boronic acid (APBA), which contains the dihydroxyboryl group, is very greatly enhanced by reacting either the APBA or the agarose first with a triazine having the structure

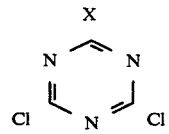

wherein X is a nucleophile or chlorine, then reacting the resulting substituted triazine or activated agarose with the other reagent to form the desired substituted agarose. The nucleophile can be any of the known ones as described in J. Am. Chem. Soc. Vol. 73, 2981–3008 (1951) including —OR and —NRR$_1$ and in which each R and R$_1$ is hydrogen, or alkyl, alkenyl, or aralkyl having up to 8 carbons, cycloalkyl, or aryl having up to 6 carbon atoms or cyanoalkyl, chloroalkyl or hydroxyalkyl having up to 3 carbons. In either case, the final product can be either monoborylsubstituted or diborylsubstituted agarose, as shown by the following reaction sequences.

For the monoborylsubstituted agarose product of the present invention, APBA concentrations of more than 30 $\mu$mol/ml agarose gel, even as high as 50 $\mu$mol/ml agarose gel or more are obtainable, while, for the diborylsubstituted product, APBA concentrations of more than 30 $\mu$mol/ml agarose gel, even as high as 70 to 100 $\mu$mol/ml agarose gel, or more are possible.

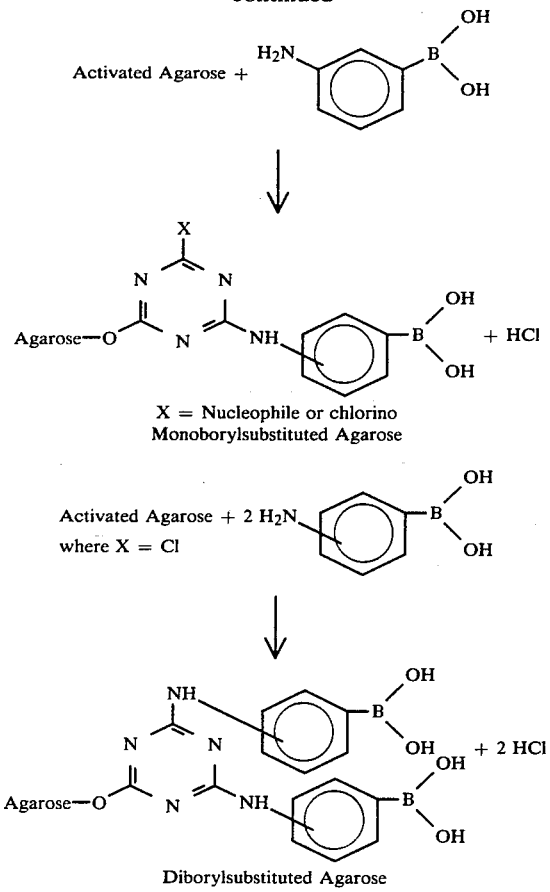

X = Nucleophile or chlorino
Monoborylsubstituted Agarose

Diborylsubstituted Agarose

Although either the diborylsubstituted or the monoborylsubstituted product can be produced using either reaction sequence, it is preferable to make the diborylsubstituted product using the sequence in which the trichloro-s-triazine is first reacted with agarose, becuase the maximum concentration of APBA on the disubstituted agarose made using that procedure is considerably higher than the maximum concentration attainable using the other procedure, which is generally only about 40 μmol APBA per ml agarose.

In making the monoborylsubstituted product, on the other hand, it is preferable to the use the procedure in which APBA is first reacted with the triazine, because it is easier, using this method, to produce monoborylsubstituted agarose which contains few molecules having two boryl groups or no boryl groups, compared to using the method in which agarose is first reacted with a triazine. This difference in purity is important because of the discovery that the diborylsubstituted agarose product will bind to certain proteins, e.g., Con A and α-glucosidase, which fail to bind to the monoborylsubstituted agarose product.

The invention can employ any agarose having a solids: water ratio, by weight, higher than 1:99. As most commercially available agarose is either 2%, 4%, or 6% solids, these are preferred, with 6% being most preferred.

Either crosslinked or uncrosslinked agarose can be used in the present invention, but crosslinked agarose is preferred. Best results are obtained when crosslinking is performed using 2, 3-dibromopropanol, according to standard procedures.

The agarose used in the present invention is preferably in bead, rather than solid gel form, so that maximum surface area is provided for target molecule separation. Preferred are spherical beads 25 to 200 μm in diameter, most preferably 50–150 μm in diameter.

Several reaction characteristics should be kept in mind when using the agarose activation method in which the agarose is first reacted with the triazine. First, triazine activation of agarose is an exothermic reaction which creates heat ncessary for further reaction. Thus, too much cooling can inhibit the reaction. Excess heat, on the other hand, can also be harmful because it can cause the undesirable generation of cyanuric acid. Care should thus be taken to maintain the temperature within the range 25° C. to 35° C., optimally 30° C.

During the agarose activation step, the pH should be maintained at least 12 in order to insure formation of agarosate groups and that the HCl liberated by activation is neutralized, and below about 13 so that the triazine is not rapidly hydrolyzed. Acetone-water is preferably used as the activation reaction medium because of its ability to dissolve a large amount of the triazine, and its non-reactivity with the triazine or with alkali. Any other solvent or solvent mixture exhibiting these characteristics can be used, e.g., dioxane, methyl ethyl ketone (MEK), or the like.

When using the agarose activation method, the proportions of agarose, ABPA, and the triazine can vary, depending on the activation level desired, and on whether the final product is to be monosubstituted or disubstituted. Thus, the final APBA concentration on the agarose can be varied by varying either the TsT or the APBA concentration or both relative to agarose. To make the disubstituted product, the amount of trichlorotriazine used can vary from 100 to 130 g per 1 of 6% solids agarose, preferably from 115 to 125 g per 1, most preferably about 120 g per 1, while the amount of APBA can vary from 16 to 20 g per 1 activated 6% solids agarose, preferably about 18 g per 1. When using agarose having a solids content other than 6%, the amounts of trichlorotriazine and APBA used should be adjusted accordingly. The proportions of trichlorotriazine, APBA, and agarose used in Example 1 below yield the maximum APBA concentration on the agarose, and APBA added in excess of the proportional amount of Example 1 will be wasted.

The temperature at which APBA is loaded onto, i.e. reacted with, the activated agarose in the second stage of this method will generally range between 40° C. and 60° C., with 45° C. being optimal. Temperatures below 40° C. result in lower APBA concentrations on the agarose gel, while temperatures above 60° C., while resulting in faster reaction, can cause damage to the gel. APBA loading can be carried out at pH between about 4 and 7, with pH 6 being optimal.

In the procedure in which the triazine is first reacted with APBA to make a monoborylsubstituted product, the ratio of triazine:APBA, by weight, can vary from about 2:1 to 1:1, with about 1.35:1 being preferred. The ratio of monoborylsubstituted triazine to agarose will vary, according to the final APBA concentration desired. In general, useful ratios will range from 5 to 70 g monoborylsubstituted triazine per 1 of 6% solids agarose, preferably 10 to 60 g per 1. When using agarose having a solids content other than 6%, the ratios should be adjusted accordingly.

In all steps of this procedure, control of temperature is very important. It is desirable, although not essential, to purify the triazine, particularly trichlorotriazine by dissolving it in a water-miscible organic solvent such as acetone, dioxane, or the like, and then reprecipitate it by dilution with cold water. During this step it is desirable to maintain the temperature below 10° C., preferably below 5° C., to avoid excessive hydrolysis of the triazine. During the subsequent reaction between triazine and APBA, it is important to maintain the temperature below 10° C. in order to obtain a pure monoborylsubstituted triazine product and above 0° C. to insure an acceptably high reaction rate; about 5° C. is preferred. At 11° C. some disubstitution occurs, and the proportion of disubstitution increases as temperature increases. At room temperature, diborylsubstitution predominates over monoborylsubstitution.

The APBA, before being reacted with triazine, is preferably at pH 6–8, most preferably 7. The triazine/APBA reaction is best carried out at a pH between 4 and 7; maximal reaction rate is achieved at a pH of about 6. If the reaction pH is above 7, the reaction product begins to solubilize, and if the pH goes above 12, it completely dissolves. On the other hand, a pH below about 4 is undesirable because hydrolysis of the unsubstituted chlorine atoms of the TsT can occur.

In both the triazine/APBA reaction and the subsequent gel loading reaction, pH is preferably controlled by the addition of a base such as KOH or NaOH, the latter being most preferred. In the gel loading reaction, preferably about 5N NaOH is added to the reaction to maintain the NaOH concentration between about 0.2 M and 0.4 M, preferably 0.3 M. Concentrations above 0.4 M can result in low ligand loading, while concentrations below 0.2 M are sufficient to allow solubilization of the ligand to insure efficient reaction with the gel substrate.

The same reaction media or solvents can be used in making the borylsubstituted triazine as are used in making activated agarose.

The loading of APBA borylsubstituted triazine onto the agarose gel is also sensitive to temperature. The reaction should be carried out at between 15° C. and 30° C., about 25° C. being preferred. Temperatures below 15° C. result in undesirably slow reaction rates, while temperatures above 30° C. result in hydrolysis and loss of ligand.

Although m-amino phenyl boronic acid is preferred for both sequential reactions because of its stability and its commercial availability, ortho- and para-amino phenyl boronic acids can also be used. The products formed with them will then be substituted at those positions, rather than at the meta-position shown in the following examples.

The following specific examples are intended to more particularly point out the invention, without acting as limitations upon its scope.

EXAMPLE 1

Diborylsubstituted agarose was prepared according to the following agarose activation method.

One liter of crosslinked, 6% solids agarose beads were suspended in 200 ml deionized water (DIW). To the slurry was then added a volume of acetone equal to the volume of the slurry. This mixture was then allowed to equilibrate for 20 min. The agarose beads were then separated by sieving on a 38 micron screen and quickly transferred to a 4 l. breaker. Two liters of 1 N NaOH solution (50:50 water/acetone by volume) were then added, and the caustic suspension was transferred to a 5 liter round-bottom flask equipped with a Lightning Mixer and a thermometer. The temperature was brought to and maintained at 23° C.±2° C., and the pH maintained between 12 and 13.

Fresh TsT (120.0 g) was added as a powder to the reaction mixture and the mixture was then stirred vigorously to dissolve all of the TsT. The TsT was added at a rate which maintained the temperature of the reaction at 30° C. After the TsT had been completely added (10 to 15 minutes), the stirring speed was reduced and the mixture was allowed to gradually cool while the reaction continued for an additional 100 minutes.

The activated agarose was then removed from the reactor, dewatered, and resuspended in an equal volume of 50% water/acetone, as above, and allowed to equilibrate for 5–10 minutes. The agarose gel was then loaded into a column and washed with DIW at a rate of 200 ml/min until the pH reached approximately 8. The activated agarose was, at this point, ready for reaction with APBA.

The activated agarose was removed from the column and combined, in a 2 liter beaker, with 1 liter DIW. Eighteen g purified meta-APBA were then added, and the mixture stirred to produce a suspension, the pH of which was adjusted to 6.0 using 6N HCl or 5N NaOH. The mixture was then transferred to a 5 liter reactor equipped with a heating mantle, stirring paddle, and thermoregulator. The reactor was heated quickly to 45° C., and that temperature was maintained for 18 hours. The reaction mixture was then loaded into a column, and the gel washed first with one bed volume of 0.5N NaOH, then with DIW for three hours at a rate of 200 ml/min. Finally, the gel was washed with three bed volumes of 0.05 M phosphate buffer, pH 7.2 (0.02% $NaN_3$ was added as a preservative). The resulting washed product was found to contain about 100 $\mu$mol APBA per ml of agarose gel.

EXAMPLE 2

Monoborylsubstituted agarose was prepared according to the following procedure.

TsT (46.1 g) was added to 0.35 l of acetone, to make a clear, almost saturated solution. (A cloudy solution should be filtered through Whatman #2 filter paper.) The TsT was then reprecipitated by pouring the solution into 1.6 liters of cold (below 10° C.) DIW. The reactor containing the TsT suspension was then placed in an ice bath and 1000g of ice from deionized water added to the reactor to maintain the reaction temperature below 5° C. A pH probe calibrated at 5° C. was placed into the TsT reactor, and a pH meter connected to a strip chart recorder was used to follow pH throughout the course of the TsT-APBA reaction.

In a separate reaction vessel, 34.0 g m-APBA were added to 500 mls DIW, and the pH was raised to about 7 by the addition of 5N NaOH. The APBA solution/slurry at room temperature was then added to the TsT mixture all at once, and the pH maintained at about 6 throughout the reaction by the addition of 5N NaOH. During the course of the reaction, which was completed in slightly less than one hour, the texture and color of the precipitate changed, and the rate at which NaOH needed to be added decreased. At the end of the reaction, 10 mls of 6N HCl were added to acidify the solution and to form a more easily separated flocculate. The solid product was separated from the rest of the reaction mixture in a basket centrifuge and then washed with 1 liter DIW to remove any salts present. A small weighed sample was dried to constant weight (approx. 3 hours at 60° C.) and the percent solids determined (typically 30%). The filter cake of monoborylsubstituted triazine was now ready for reacting with, i.e. bonding to, agarose.

One liter of sieved, crosslinked, 6% solids agarose beads were placed in a glass reaction vessel along with 120.0 mls 5N NaOH and 58.5 g NaCl; the NaCl was used to reduce clumping of the beads. To take into account the substantial amount of water contained in the borylsubstituted triazine filter cake, DIW was added to the reactor in a volume equal to 880 mls minus the water contained in an amount of filter cake equivalent to 60 g dry weight. The alkali agarose gel was then stirred for 20 minutes.

The equivalent of sixty g dry weight of the borylsubstituted triazine prepared as described above were added to the alkali agarose all at once, and the reaction was allowed to proceed with stirring for 18 hours, the temperature being maintained at about 25° C. throughout its course.

At the end of the reaction, the gel was removed and placed in a column for washing. The gel was washed with one bed volume 0.5N NaOH, and then washed with DIW at a rate of 200 mls/min until the pH fell below 9. Finally, the gel was washed with 0.05M phosphate buffer, pH 7.2, until the gel was 7.2, or until four bed volumes of buffer had been used. The resulting washed product was found to contain about 40 $\mu$mol APBA per ml of agarose gel.

EXAMPLE 3

The procedure described in Example 2, above, was followed, with the difference that 10 grams, rather than 60 grams, of borylsubstituted triazine were used. This yielded a monosubstituted product having 10 to 15 $\mu$mol bound APBA per ml agarose gel.

EXAMPLE 4

In a preferred method of purifying, from APBA hemisulfate, APBA to be used in either sequential procedure of the invention, 145 mls DIW were heated to 92° C. on a stirrer hot plate, and then 25 g of finely ground APBA hemisulfate were added. The pH of the mixture was adjusted to 7.0 by the addition of NaOH (0.5 g/ml) in aqueous solution. Approximately 12.8 mls of the NaOH solution were required to neutralize all of the sulfuric acid, at which point the mixture turned an amber color.

Approximately 1 g of activated charcoal was added to the solution, which was then filtered through Whatman #1 filter paper using a Buchner funnel and a 250 ml side arm vacuum flask. The flask containing the APBA solution was then quickly cooled under cold running water. A seed crystal of pure APBA was added, causing the crystallization of light tan crystals of APBA, which were filtered out of the mixture and then dried for 30 minutes at 45° C. The dried crystals were then loaded into an extraction thimble and extracted with diethylether until about 1 g of brown oil remained in the thimble. The ether in the ether reservoir was distilled off, leaving purified APBA, which was removed from the reservoir with a spatula and then ground to a fine powder.

EXAMPLE 5

According to the following method, APBA was purified from APBA hemisulfate, and used in the procedure described in Example 2.

Two hundred and two g hemisulfate (APBA $\frac{1}{2}$ H$_2$SO$_4$) were added to 1200 mls DIW. 5 N NaOH was added gradually and with sufficient stirring to dissolve all of the APBA and raise the pH of the solution to about 7. APBA crystals then precipitated out of the unstable solution, the mixture was filtered through Whatman #2 filter paper and the residue saved. The filtrate was treated with 0.5 g decolorizing charcoal and filtered. The residue from the previous step was then suspended in this treated filtrate. The entire suspension was then reacted with TsT in acetone, as described in Example 2, with the only difference being the necessity of using a greater volume of 5 N NaOH in order to raise the pH of the APBA slurry to 7 prior to reacting it with the TsT mixture. The remaining steps were as described in Example 2, and the resulting product similarly contained an APBA concentration of about 40 $\mu$mol per ml gel.

EXAMPLE 6

Activation with Dichloro Methoxy Triazine (DMT)

100 mls of crosslinked agarose beads were transferred into 50% acetone by adding 100 mls of acetone and allowing the gel to equilibrate. The beads were sieved on a 325 mesh (45 $\mu$) screen to remove excess liquid.

The agarose beads were than transferred into a 500 ml bottle along with 200 mls of 0.66 M NaOH 50% acetone. The agarose beads were allowed to equilibrate at least five minutes but no more than 4 hours with some intermittent shaking to resuspend the beads.

Predetermined amounts of DMT (1, 3, 5, 10, 20, 30 and 40 mg/ml) were added to different samples of the reaction mixture. The bottles were capped and placed into a shaker bath at 40° C.±2° C. for 1 hour.

After 1 hour the bottles were removed from the shaker bath and washed in a column as follows:
1. 1×100 mls of 0.5 M NaOH
2. 3×100 mls of DIW
3. Wash with pH 7.2 0.1 M phosphate buffer until pH of gel is equivalent to buffer.

The level of activation was determined in each case by first reacting the gel with a diamine and then assaying for the second amino group with ninhydrin. The activated agarose products thus prepared displayed the following activities, respectively (micro equiv./ml of gel active chlorine groups): 1.5, 3, 8, 15, 23.5, 41.5, 50. The products were relatively stable compounds, and formed stable bonds with amino groups.

Coupling with APBA, Example 100 mls of an activated agarose specimen prepared as described above (activity 43.9 $\mu$Eq/ml) was equilibrated for more than 5 minutes but less than 30 minutes with 100 mls pH 6.0 2.0M phosphate buffer. 2.0 grams of recrystallized APBA was added to the reaction mixture. The mixture was placed into a 250 ml bottle, capped, and the bottle placed in a shaker bath at 40° C.±2° C. for 16 hours.

The gel was then loaded into a column and washed as follows:
1. 1×100 mls 0.5 M NaOH
2. 3×100 mls DIW Analysis by a boron specific reagent (azomethine—H)[4] results in good agreement with ninhydrin assays of the same activated agarose before reaction with APBA, showing that the reaction with APBA was virtually quantitative to form a colorless monoborylsubstituted agarose in which X is methoxy and which is stable at high pH (in 0.5 M NaOH).

EXAMPLE 7

13.2 grams (0.0735 moles) of dichloromethoxytriazine was dissolved with a minimum of acetone, then reprecipitated into 500 mls of well stirred room temperature deionized water. A pH probe was placed into the reaction vessel to monitor the pH of the reaction media. 10.0 grams (0.0735 moles) of APBA was added directly to the reaction vessel. Immediately 2 N NaOH was added as needed to maintain a pH of $6 \pm 1$ pH unit. The reaction consumed 34.9 mls of 2 N NaOH (95% of theoretical). After approximately 20-25 minutes no further pH change was noted and the reaction was terminated by adding 5 mls of 2 N HCl. The precipitated product was then separated with a basket centrifuge. The filter cake was washed with 500 mls of deionized water, and dried overnight at 70° C. Yield: 18.6 g or 90.5% of theoretical of monoborylsubstituted triazine in which X is methoxy. It was stable as a dry powder for several weeks. It did not melt but decomposed above 200° C. and was soluble in acetone and in aqueous alkali.

Approximately 100 mls of crosslinked agarose beads were sieved on a 325 mesh (45 μ) sieve to remove excess water. 100 g of gel was weighed out (1 g=1 ml). Next 100.0 mls of 0.8 M NaOH 1.0 M NaCl was added to the gel. After equilibrating for at least 5 minutes, but no longer than 4 hours, there were added to separate specimens of the reaction mixture varying amounts of the monoborylsubstituted triazine described in the preceding paragraph, as follows: 10, 15, 20, 25, 30, 35, 40 and 60 mg/ml. Each reaction mixture was capped and placed in a shaker bath at 40° C.±2° C. for 16 hours. The gel was removed and loaded into a column for washing according to the wash schedule below:
1. 1×100 mls 1 bed volume 0.5 M NaOH
2. 5×200 mls DIW The gel was assayed for boron by use of the boron specific reagent azomethine-H[4] and the monoborylsubstituted agarose products in which X is methoxy were found to have the following activities, respectively: 9, 10.6, 11.6, 12.4, 13.0, 13.1, 14.4 and 19.0 μEq/ml.

EXAMPLE 8

5 grams (0.0271 moles) of trichloro-s-triazine (TsT) was dissolved in 23 mls of acetone. The TsT solution was reprecipitated into 50 mls of 0.1M phosphate buffer pH 7.5. The reaction mixture was cooled to less than 5° C. where it was maintained throughout the reaction. 1.65 g (0.0271 moles) of monoethanolamine was added to the reaction vessel, and after ½ hour the reaction temperature was allowed to gradually increase to room temperature. The reaction was allowed to sit overnight before filtering. The product triazine in which X is hydroxyethylamino was dried at 60° C. overnight. Yield 64% mp 91°-3° C.

2.0 grams (0.010 moles) of the triazine described in the preceding paragraph was suspended into 50 mls of deionized water. 1.3 grams (0.01 moles) of APBA was added to the reaction mixture. The pH of 7-8 was maintained by adding in NaOH. The reaction time was 30 minutes and the reaction consumed 19.0 mls or 2 molar equivalents. The precipitate was removed with a basket centrifuge and dried at 60° C. overnight. Yield was 2.95 g or 100% of theoretical. The product, monoborylsubstituted triazine in which X is hydroxyethylamino, did not melt but decomposed above 310° C.

100 mls of settled agarose beads were equilibrated with 100 mls 0.8 NaOH 1 M NaCl. This caused the final concentrations to be diluted in half. 1.0 gram of the monoborylsubstituted triazine described in the preceding paragraph was added and the reaction mixture was placed into a shaker bath at 40° C.±2° C. The reaction was allowed to run for 16 hours. The gel was then loaded into a column and washed as follows:
1. 1×100 mls 0.5 M NaOH
2. 2×200 mls deionized water The activity of the product was 5.72 μEq/ml.

What is claimed is:

1. Compounds having the structure

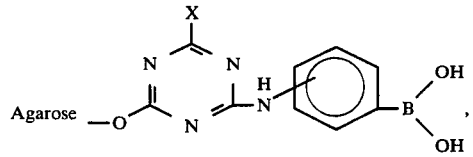

wherein X is Cl, —OR, or —NRR₁ wherein each R and R₁ is hydrogen, or alkyl, alkenyl, or aralkyl having up to 8 carbons, cycloalkyl, or aryl having up to 6 carbon atoms or cyanoalkyl or hydroxyalkyl having up to 3 carbons.

2. Compound having the structure

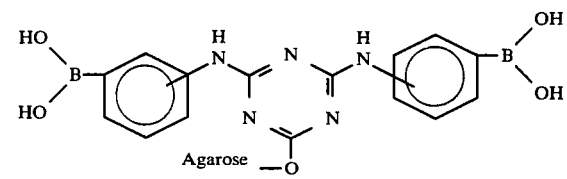

3. The compounds of claim 1 wherein the amino phenyl boronic acid portion thereof comprises at least 30 μmol per ml of agarose.

4. The compound of claim 2 wherein the amino phenyl boronic acid portion thereof comprises at least 30μ mol per ml of agarose.

5. The compound of claim 1 wherein X is Cl.

6. The compound of claim 1 wherein X is —OCH₃.

7. Compounds having the structure $$\begin{array}{c} Cl \\ N \diagdown N \\ \| \quad \| \\ O \diagup N \diagup X \\ | \\ Agarose \end{array}$$

wherein X is Cl, —OR, or —NRR₁ wherein each R and R₁ is hydrogen, or alkyl, alkenyl, or aralkyl having up to 8 carbons, cycloalkyl, or aryl having up to 6 carbon atoms or cyanoalkyl, chloroalkyl or hydroxyalkyl having up to 3 carbons, said compound having the property that 1 ml of said compound bonds to at least 30μ mol of m-amino phenyl boronic acid.

8. The compounds of claim 7 having the property that 1 ml of said compound bonds to at least 70μ mol of m-amino phenyl boronic acid.

9. The compound of claim 7 wherein X is Cl.

10. The compound of claim 7 wherein X is —OCH₃.

* * * * *

UNITED STATES PATENT AND TRADEMARK OFFICE
CERTIFICATE OF CORRECTION

PATENT NO. : 4,562,251
DATED : December 31, 1985
INVENTOR(S) : Scott Fulton et al It is certified that error appears in the above-identified patent and that said Letters Patent are hereby corrected as shown below:

Column 10, line 28, after "cyanoalkyl", insert --, chloroalkyl--.

Signed and Sealed this

Nineteenth Day of August 1986

[SEAL]

Attest:

Attesting Officer

DONALD J. QUIGG

Commissioner of Patents and Trademarks